Patented June 8, 1954

2,680,696

UNITED STATES PATENT OFFICE 2,680,696

METHOD OF ESTERIFYING THE SURFACE OF A SILICA SUBSTRATE HAVING A REACTIVE SILANOL SURFACE

Edward C. Broge, Cecil County, Md., assignor to E. I. du Pont de Nemours and Company, Wilmington, Del., a corporation of Delaware No Drawing. Application February 14, 1951, Serial No. 210,981

9 Claims. (Cl. 117—100)

This invention relates to processes whereby siliceous solids are made hydrophobic by chemical reaction with primary or secondary monohydric alcohols having more than one carbon atom, in the presence of water, and is more particularly directed to such processes in which a siliceous material having a specific surface area greater than one square meter per gram, in an aqueous alcohol mixture which in the absence of the alcohol has a pH of 4.5 to 7.5 and which mixture comprises the alcohol and water in a weight ratio of from 2.33:1 to 19:1, is heated in a closed system at a pressure of 2,000 to 20,000 pounds per square inch and a temperature of 270 to 375° C., and while maintaining the temperature in this range, the pressure is reduced substantially to atmospheric by venting vapors from the system.

Silica products containing hydrocarbon groups are already known, but most of these materials bear no resemblance whatever to the compositions produced according to the present invention. According to Elliott et al. Patent 2,441,423, for instance, sols and gels containing silica and alkyl groups are produced, but in these products the alkyl groups are attached directly to silicon atoms, there being no oxygen atom between the carbon and silicon, and hence no esterification. Kirk Patents 2,395,880 and 2,408,654, describe esterified products, but the silica is of low molecular weight and not in the form of discrete, dense ultimate particles. The Kirk products are liquid when first prepared, but are subject to the danger of gelling through continued polymerization of the silica—a danger inherent in any silica product of low molecular weight. The processes disclosed by Elliott et al., and by Kirk, do not employ the techniques of the present invention nor give the same results.

In Kistler Patents 2,093,454; 2,188,077; and 2,249,767, there are described methods for making silica "aerogels" by heating silica gel in a liquid medium above the critical point and releasing vapors therefrom. The products so obtained are hydrophilic, rather than organophilic or hydrophobic, and it has not been apparent whether or how Kistler's processes could be modified to produce hydrophobic products.

In co-pending application Ser. No. 171,759, filed July 1, 1950, by Ralph K. Iler now abandoned, it is disclosed that when silica is heated in relatively anhydrous alcohol to elevated temperatures, under pressure, surface esterification of the silica is effected. However, if in Iler's processes water is present in excess of about 5% by weight in the alcohol, no appreciable degree of surface esterification occurs and the product obtained is not hydrophobic.

It is an object of this invention to provide processes for making solid siliceous materials organophilic and hydrophobic by reason of chemical interaction with primary or secondary monohydric alcohols having more than one carbon atom. Another object is to provide such processes which are operable in the presence of substantial proportions of water, whereby the necessity of employing anhydrous alcohol and providing for the removal of water during the reaction is obviated. Another object is to provide such processes which are applicable for the esterification of silica and other siliceous materials in the form of solids having relatively large surface area in proportion to weight, as, for example, in the form of sols of particulate silica, or hydrated silica gels, or finely divided silica powders, or precipitated, hydrated, super-colloidal silica particles. Further objects will become apparent hereinafter.

The foregoing and other objects are accomplished according to the present invention by processes comprising heating, in a closed system at a pressure of 2,000 to 20,000 pounds per square inch and a temperature of 270 to 375° C., a siliceous material having a specific surface area greater than one square meter per gram in an aqueous alcohol mixture which in the absence of the alcohol has a pH of 4.5 to 7.5 and which comprises the alcohol and water in a weight ratio of from 2.33:1 to 19:1, the alcohol being selected from the group consisting of primary and secondary monohydric alcohols having more than one carbon atom, and while maintaining the temperature in the range from 270 to 375° C., reducing the pressure substantially to atmospheric by venting vapors from the system. In a preferred embodiment of the invention, after venting the pressure, the product is cooled to below about 150° C. in the absence of air and moisture.

In the processes described, the siliceous materials are made hydrophobic and organophilic. This is due to the esterification, by the alcohol, of surface-OH groups on the silica, so that the silica acquires a layer of surface-OR groups, the R corresponding to the hydrocarbon group of the alcohol. That such an esterification should occur in the presence of substantial amounts of water is surprising, and a theoretical explanation of it is here offered only to confirm the observed facts.

It is believed that the esterification of the silica is an equilibrium reaction which is influenced greatly by the concentration of water in the phase of the alcohol-water mixture which is in direct contact with the silica surface. An increase in temperature apparently favors a shift in the equlibrium to increase the esterification. In the alcohol-water system there is a greater percentage of water in the liquid phase than in the gaseous phase, and therefore esterification is favored when the water-rich liquid phase is absent. This liquid phase is obviated by heating the mixture to a temperature and pressure above the critical point; under these conditions, and at the correct pH, the surface of the silica becomes esterified, and the alcohol-water vapor phase is then rapidly removed from the reaction zone under such conditions that the equilibrium is essentially arrested, and no further liquid phase appears in the reaction zone. In general, temperatures somewhat above the critical temperature are most desirable, since they favor the esterification equilibrium.

In the ordinary manner of carrying out a process of this invention, a finely divided siliceous material, such as amorphous silica in the form of an aqueous colloidal sol, precipitated supercolloidal particles such as a wet filter cake, or a conventional hydrated silica gel, is adjusted to a pH of from 4.5 to 7.5, mixed with sufficient alcohol so that the liquid phase contains from 5 to 30% water by weight, is placed in a pressure vessel such as an autoclave or bomb, and is heated to a temperature and pressure above the critical point of the mixed solvent, the temperature being from 270 to 375° C. and the pressure from 2,000 to 20,000 pounds per square inch. When the maximum temperature and pressure to be used are reached, the vapors are vented at the maximum temperature until the pressure has been reduced to that of the atmosphere, and the contents of the autoclave are cooled in the absence of air and moisture to a temperature less than about 150° C. and are then removed from the autoclave. The process may alternatively be carried out in a pressure pipeline under similar conditions, the reactants being continuously fed into the pipeline, except that in this embodiment the entire reaction mixture is vented suddenly to atmospheric pressure at the discharge end of the pipeline, the solvents being carried off as vapor and the siliceous product being deposited as a fine, light, fluffy powder. In either case, the products are both organophilic and hydrophobic by reason of the fact that they contain chemically-bound, surface-OR groups.

Since the purpose of the present processes is to effect a chemical reaction between the siliceous material and the alcohol, it is important that each of the conditions be controlled within the ranges specified above. In prior art processes, which have been concerned merely with the physical problem of drying silica without disrupting the structure, there has been either no reason to exercise control on the conditions within the ranges specified or else there has been good reason to control the conditions outside the ranges which are here essential. A detailed description of the conditions necessary for the successful operation of the processes of the present invention will now be given.

THE SILICEOUS SOLID

The materials esterified according to processes of this invention are in the solid state. They are siliceous, in that they have structures containing predominant proportions of siloxane (Si—O—Si) bonds. They can be amorphous silica. They can be water-insoluble metal silicates, such as natural or synthetic crystalline silicate minerals, asbestos and clays being common examples of such materials, or they can be synthetic, amorphous silicates. In all cases their surfaces must be substantially covered with silanol (—Si—OH) groups. In the case of the metal silicates, this may be achieved by activation with acid or by coating with a layer of amorphous silica.

The siliceous material used must have a relatively large surface area in relation to its mass, the specific surface area, as determined by conventional nitrogen adsorption methods, being at least one, and preferably twenty-five or more, square meters per gram.

Aqueous silica dispersions and colloidal sols

The solid siliceous material to be esterified may be in the form of aqueous silica dispersions or colloidal sols. The silica may, for instance, be in the form of an aqueous dispersion of dense, amorphous, discrete, essentially spherical particles, and such particles may be larger than 15 millimicrons, preferably from 15 to 130 millimicrons, and particularly from 15 to 50 millimicrons, in diameter. Such dispersions differ from the ordinary silica sols of the prior art in that the individual particles are substantially larger, and are dispersed as single particles rather than as aggregates of gel. Nevertheless, to the unaided eye the dispersions appear as silica sols.

Suitable silica dispersions for use in a process of this invention may be prepared by any of a number of processes which are characterized by "build-up." A silica sol prepared by ion-exchange in the manner described in Bird 2,244,325 may be heated to a temperature above 60° C. and further quantities of the same type of sol may be added until at least five times as much silica has been added to the original quantity as was at first present. By this means a "built-up" dense particle, which may be in the size range from 15 to 130 millimicrons, is produced. The particles may be removed from the sol by the addition of a salt such as sodium sulfate or by the precipitation by the use of a small amount of a polyvalent metal salt. There may be used salts of such divalent metals as calcium, zinc, magnesium, lead, barium, or beryllium, such trivalent metals as aluminum, iron, or chromium, such tetravalent metals as titanium, zirconium, and stannic tin, and such multivalent metals as manganese. It is preferred to use those metals, the hydroxides of which are not precipitated in the pH range below 6. The soluble salts of the metals may be used, such as the chlorides, sulfates, nitrates, sulfamates, or any other soluble salt.

By the use of a few per cent, say about five per cent of such a compound, the polyvalent metal is apparently reacted with the surface of the silica particles. In any event the particles are precipitated. For the present purpose, the cation retained by the silica is removed from the precipitated product by an acid wash or by cation-exchange, and the silica is thereby redispersed.

The silica may also be precipitated by adding a long-carbon-chain nitrogen compound such as a long-chain amine or a long-chain quaternary ammonium compound, as described in application Ser. No. 99,355 filed June 15, 1949, by Ralph K. Iler now U. S. Patent No. 2,663,650. Representative of the long-chain amines are decyl, lauryl, stearyl, cetyl and oleyl amines, and representative of the quaternary compounds are cetyl trimethyl ammonium bromide, lauryl pyridinium chloride, lauryl trimethyl ammonium chloride and similar compounds. The precipitated products are filtered off, washed and redispersed by removing the precipitating agent by acid wash or ion-exchange.

Instead of the processes outlined generally above, dense particles comparable in character to those above described may be prepared by adding an acid such as sulfuric to a hot (above 60° C.) solution of sodium silicate. The addition is conducted over a period of time. The sodium ion concentration in the solution must not exceed one normal. The products thus formed can be precipitated from the solution by methods as above described, washed, and redispersed. The details of a typical preparation of a silica suitable for use according to the present invention are described in co-pending application Ser. No. 65,525 filed December 15, 1948, by Ralph K. Iler now abandoned.

Instead of following the precise practices of the prior abandoned application, Serial No. 65,525, a product of the same type may be prepared by heating a silica sol to a temperature above 60° C. and adding thereto a silicate solution and enough of an acid to maintain a pH from eight to eleven, the heating to above 60° C. and the addition of silicate and acid being continued until the silica particles in the sol have reached an average particle size of from 15 to 130 millimicrons. Details of such a process are described in an application Ser. No. 99,350, filed June 15, 1949, by G. B. Alexander, F. J. Wolter, and R. K. Iler, now U. S. Patent No. 2,601,235. Following the "build-up," the particles are precipitated, washed, and redispersed as already described above.

In the processes of this invention it is important to start with a dispersion which is substantially free of metal cations and preferably also, of anions. This condition can be obtained in any of the dispersions prepared as above-described, by passing the dispersion alternately through a cation-exchanger, such as described in the Bird Patent 2,244,325, and then through an anion-exchanger such as the metaphenylene-diamine-formaldehyde resin described in Ryznar Patent 2,438,230. Such processes for preparing deionized sols are fully described in co-pending application Ser. No. 97,090 filed June 3, 1949, by F. J. Wolter now abandoned.

*Finely divided siliceous solids in the form of supercolloidal coherent aggregates*

In place of silica in the form of dispersions and colloidal sols prepared as above described, there may be employed in a process of this invention any of the materials described as siliceous substrates suitable for esterification by a process of abandoned co-pending application Ser. No. 171,759, filed July 1, 1950, by Ralph K. Iler. Such materials are practically all prepared originally in aqueous suspension, usually by methods involving a building up of the silica particles, followed by coagulation and filtration to remove most of the water. The present esterification process is particularly advantageous in that there is no need to dry completely these siliceous substrates; instead, they may be used directly in the form of the wet filter cakes or centrifugates, avoiding additional costly and time-consuming drying steps. In addition, the structure of silicas having high surface areas and small particle sizes is known to collapse when such materials are dried from water, hence the use of completely dry conventional, high-surface-area gels is not preferred in the abandoned Iler application Ser. No. 171,759. In the processes of the present invention, however, such gels need not be dried completely from water, but the wet materials may be used directly in the process and hence there is no occasion for the gel structure to collapse.

*Conventional silica gels*

Conventional silica gels, prepared by acidifying sodium silicate and washing out salts and excess acid from the gel so formed, according to well-known methods of the prior art, may be esterified according to the present processes. So, also, may be gels prepared by deionizing colloidal silica sols and adjusting the pH to cause gelation.

THE ALCOHOLS USED

The alcohols used according to a process of this invention are selected from the group consisting of primary and secondary monohydric alcohols having more than one carbon atom, and thus the carbon atom attached to the —OH group of the alcohol is also attached to at least one hydrogen atom. It is preferred that the alcohols be at least partially miscible with water under the temperature and pressure conditions at which esterification occurs in the process. The compatibility of the higher alcohols in water may be increased by adding lower alcohols with higher solubilities to the system as compatibilizing agents. It is, of course, necessary that any of the materials used be stable under the conditions of high temperature and pressure at which the esterification occurs. Thus any alcohol, ether, ketone, or other possible polar organic solvent which is known to crack or otherwise decompose at the temperatures of the reaction may not be used.

It is preferred to use in the present novel processes alcohols which have from 2 to 18 carbon atoms and the use of alcohols having from 2 to 6 carbons is particularly preferred. The reasons for such preferences are the same as those given in respect to the same preferences in the above-mentioned abandoned Iler application Ser. No. 171,759. In no case will the mixture of alcohol and water have a critical temperature above that of water (about 374°).

Particular, preferred alcohols which may be used, therefore, include ethyl, normal- and iso-propyl, normal- and iso-butyl, and normal- and iso-amyl alcohol.

THE ESTERIFICATION PROCESS

*Water content*

While in the above-mentioned Iler application abandoned Ser. No. 171,759 it is stated that the water content must be below 5% by weight in order for esterification to occur, it has been found that the present novel processes are operable at much higher water contents. The amount of water present may be expressed in terms of the weight ratio of alcohol to water. For operation in accordance with the present invention, the weight ratio of alcohol to water should be from 2.33:1 to 19.0:1.

*pH*

In general, it is necessary to avoid the presence of large amounts of either strong acids or strong alkalis. It has been found that in the processes of this invention the esterified silicas hydrolyze, and decomposition of the alcohols is favored, at low pH. A very high pH is undesirable because the silica cannot be maintained in a predetermined size range or with a predetermined set of physical characteristics, because the alkali tends to cause particle growth and aggregation during the process, thereby effecting a continuous change in the surface of the silica and thus interfering with the esterification. The presence of large amounts of alkali also causes hydrolysis of the esterified silica. It has been found that the pH must be within the range of 4.5 to 7.5 as measured without the alcohol present.

Silica itself has a natural acidity in the range of about 4.5 when washed free of impurities. In the case of precipitated silicas or silica gels prepared from alkali silicates and acids, there may be alkali trapped within the particles and this may come out during the reaction, causing an increase in pH. In such instances, it is desirable to adjust the pH of the starting material to a value of 6 or less.

The pH is measured by conventional methods, but on the aqueous silica dispersion without the alcohol present. Thus, the silica dispersion may be prepared, the pH adjusted to the specified range, and the alcohol then added. However, this order of addition of the reactants is not essential, since at any time the pH may be determined merely by removing the alcohol by conventional methods. Ordinarily, the correct proportions for a particular set of reactants can be determined, and thereafter the pH will be found to be a particular value for these proportions.

Temperature

The position of the equilibrium in the alcohol-water-silica system is dependent upon the temperature, the higher temperature favoring the esterification reaction. Excellent results have been obtained at temperatures above 270° C. and below 375° C. The preferred temperature range is from about 280 to about 335° C. The maximum temperature should not, of course, exceed the temperature of pyrolysis of the alcohol or other compatibilizing solvents. It is preferred to operate above the critical temperature and pressure, in order to avoid the presence of a liquid phase, since such a phase will usually contain a higher concentration of water than the vapor phase. By maintaining conditions above the critical point it is possible to carry out the process very efficiently and obtain a substantially uniformly esterified, hydrophobic product.

Pressure

The reaction should be carried out above the critical pressure, but it is not necessary to go to excessive pressures. In general, pressures less than 20,000 pounds per square inch are preferred, and usually there is no need to go to pressures above 10,000 pounds per square inch. The pressures must be about 2,000 pounds per square inch or over, however, in order to obtain the desired, highly esterified, hydrophobic products. A pressure in the range of about 4,000 to 5,000 pounds per square inch is usually very satisfactory.

Venting and cooling

Ordinarily, the time required to heat the reaction mixture to the desired temperature range will be sufficient to allow the esterification reaction to occur, since this reaction proceeds very rapidly under the conditions specified. As soon as the reaction has had an opportunity to occur, the pressure may be vented, but no appreciable amount of vapors or liquid should be vented before the maximum conditions of temperature and pressure are reached—that is, well above the critical point, since otherwise, if vapors are vented, the pressure will be reduced below the required range, the ratio of liquid phase to silica will be reduced, and other changes will occur, so that a hydrophobic product will not result.

It is desirable to vent the pressure as rapidly as can be done conveniently, since the object of this step is to arrest the equilibrium and dry the silica, and it is desirable not to subject the esterified product to prolonged heating while the alcohol is being removed. Decomposition of the esterified product is thus avoided. When the reaction is carried out as a batch-wise process using an autoclave, however, and it is desired to retain the esterified product in the autoclave in the form of an aerogel, in which the macroscopic structure is not greatly broken up, the vapors may advantageously be vented more slowly.

A very effective way of carrying out the process, including the venting step, is in a high pressure pipeline reactor, into which a slurry of silica in the alcohol-water medium at a pH of 4.5 to 7.5 is fed, under pressure, at one end, the mixture is raised to the desired temperature, and is then ejected at the other end into a large volume container at atmospheric pressure in such a way that the solvent is flashed off as vapor and the esterified hydrophobic silica powder is precipitated in an atmosphere which has been swept free of moisture and air, as with nitrogen. The solvents, of course, may be condensed, recovered, and re-used in the process.

In any of the procedures described, it is desirable that the esterified product be cooled from the maximum temperature to a temperature below about 150° C. in the absence of air and moisture. This may be done by applying vacuum in the case in which an autoclave is used, or by sweeping any of the systems with a dry, inert gas, such as nitrogen, during the cooling period.

USES OF THE PROCESSES

Processes of the present invention may be used as convenient, practical methods for esterifying any of the described siliceous materials directly, in the presence of considerable amounts of water, to give hydrophobic products. The wide variety of uses of such products are described in application Ser. No. 171,760, filed July 1, 1950, by Ralph K. Iler.

Examples

The processes of this invention and their manner of application will be more fully understood by reference to the following illustrative examples.

*Example 1.*—An aqueous colloidal silica sol containing silica in the form of dense, discrete particles (number average particle diameter of silica particles =16.5 millimicrons) was passed through a bed of Nalcite HCR cation-exchange resin to give a silica sol practically free from metal cations, having a pH of 3.8, and containing 30% $SiO_2$ by weight. The pH of the sol was adjusted to 5.8 by addition of a drop of ammonia.

One hundred grams of the pH-adjusted sol were mixed with 400 grams of anhydrous ethyl alcohol and the mixture containing about 6% $SiO_2$ by weight was introduced into an autoclave. The temperature of the autoclave was raised to 300° C. over a two-hour period, the maximum pressure being 3000 p. s. i. The bomb was then quickly vented to release the solvent and was cooled while being evacuated continuously.

The product was a dry, columinous solid which was very hydrophobic. It retained its hydrophobicity for months at room temperature, and also after heating to 130° C. The specific surface area of the product as measured by nitrogen adsorption was 127.5 m$^2$/gram (as compared to a specific surface of 119 m$^2$/gram as calculated from particle diameters observed with the electron microscope). Chemical analysis of the product showed it to contain 96.2% $SiO_2$, 0.55% H, 1.63% C, 0.57% non-siliceous ash. This corresponds to calculated molar ratios $C_2H_5O/Si=$ 0.042 and $OH/Si=0.13$. The number average particle diameter of the silica particles in the esterified product was 18.4 millimicrons as measured from electron micrographs. The specific surface area as measured by nitrogen adsorption was 95 square meters per gram.

To show the character of product obtained when the pH is not in the specified range of 4.5 to 7.5, the following experiment is of interest:

A commercial aqueous colloidal silica sol containing silica in the form of discrete, dense ultimate particles and known as "Ludox" was deionized as described in Example 1 to yield a sol at pH=3.8.

One hundred grams of the sol was mixed with 400 grams of anhydrous ethyl alcohol and introduced into an autoclave. The temperature of the autoclave was raised to 310° C. over a period of 1¾ hours, the maximum pressure being 3000. The bomb was then quickly vented to release the solvent.

The product was in the form of rigid, translucent, low-density, solid chunks which were hydrophilic. This illustrates that to obtain esterification the pH must be in the range specified, viz., 4.5 to 7.5.

*Example 2.*—This experiment was carried out according to the method described in Example 1 except that the starting silica sol contained silica in the form of dense, discrete particles having a number average particle diameter of 27 millimicrons and the pH of the sol was 5.6. The maximum temperature of the autoclave was 295° C. and the maximum pressure 3000 p. s. i. g.

The product was a dry voluminous solid which was very hydrophobic. It retained its hydrophobicity for months at room temperature or upon heating to 130° C. The specific surface area of the product as measured by nitrogen adsorption was 67.5 m$^2$/g. as compared to a specific surface area of 72 m$^2$/g. calculated from particle diameters observed with the electron microscope. The number average particle diameter of silica ultracules in the product was 31 millimicrons as measured from electron micrographs. Chemical analysis of the product showed it to contain 96.29% $SiO_2$, 0.39% H, 0.97% C, 0.83% non-siliceous ash.

*Example 3.*—This experiment was carried out as described in Example 1 except that the starting silica sol contained silica in the form of dense, discrete particles having a number average particle diameter of 59.2 millimicrons. The pH was 4.6, the maximum temperature reached during the esterification was 325° C. and the maximum pressure was 4000 p. s. i.

The product was a soft, dry powder which was very hydrophobic and retained its hydrophobicity after months at room temperature or upon heating to 130° C. The specific surface area of the product as measured by nitrogen adsorption was 32.7 m$^2$/g. as compared to a specific surface area of 37 m$^2$/g. calculated from electron micrographs. The number average particle diameter of silica ultracules in the product was 70 millimicrons as determined from electron micrographs. Chemical analysis of the product showed it to contain 97.44% $SiO_2$, 0.28% H, 0.57% C, and 1.12% non-siliceous ash.

*Example 4.*—A hydrophobic esterified siliceous material was prepared by esterification of a pressed wet cake of precipitated, finely divided supercolloidal aggregates of amorphous silica as follows:

Four hundred twenty-five pounds of a sodium silicate solution containing 2.39 grams $SiO_2$ per 100 milliliters of solution and having a molar $SiO_2:Na_2O$ ratio of 3.25:1 was charged to a 100-gallon steel tank equipped with a one-half horsepower 400 r. p. m. "Lightnin" mixer driving a 10" diameter, 3-bladed propeller. The silicate was heated to a temperature of 35±2° C. by steam injection. A sufficient amount (about 162 pounds) of a solution containing 2.40% $H_2SO_4$ was added uniformly over a period of about 30 minutes to bring the pH to 9.7±0.2 as measured at 25° C. During this period, the temperature of the reacting mass was maintained above 30° but below 40° C. The clear sol thus obtained was heated to 95° C. over about 15 minutes.

Solutions of sodium silicate and sulfuric acid were then added simultaneously at a uniform rate over a period of 2 hours through inlets located close to the vortex formed by the agitator. Eighty-five and four tenths pounds of the sodium silicate solution were used, which contained 13.22 grams of $SiO_2$ per 100 milliliters of solution and had a molar $SiO_2:Na_2O$ ratio of 3.25:1. The sulfuric acid was a 4.65% aqueous solution and was added in an amount to maintain the pH of the reaction mixture at 10.3±2 at 25° C. throughout the course of the reaction. Such an amount is sufficient to neutralize about 80% of the $Na_2O$ in the silicate solution and maintain the sodium ion concentration below 0.3 normal throughout the process. The temperature was maintained at 95° C. throughout the addition of acid and silicate.

Still maintaining a temperature of 95° C., the pH of the solution was adjusted from 10.3 to 5.0 by adding 4.65% sulfuric acid at a rate of about 0.24 gallons per minute for 20 minutes and then adding small portions followed by repeated pH determinations until the pH was 5 at 25° C. This required about 32 pounds of the sulfuric acid solution.

The slurry thus obtained was then maintained at 85–95° C. without agitation for from four to 16 hours in order to coagulate the precipitate to aid in filtration. The precipitate was filtered in several portions on a 50-gallon Nutsche, using nylon cloth as a filter medium. The filter cake was washed on the filter with 5 displacements of a cold 0.01 molar sulfuric acid solution having a pH of 1.93, and then sucked as dry as possible.

Analysis of a wet filter cake prepared in the above manner showed that it contained 6% solids, 1.56% non-siliceous ash, and had a pH of 2.55 when slurried with three parts of water. The specific surface area of the silica as measured by nitrogen adsorption was 350 m$^2$/g.

A 25-lb. portion of the above wet cake was formed into squares, each square was wrapped in medium heavy canvas, the squares were placed one on top of the other with a wire gauze placed between each and the assembled sample was "squeezed" between platens on a Carver press. Hydraulic pressure was applied until a loading of 17,500 pounds was obtained. This corresponds to a pressure of 750 p. s. i. on the wet cake. The resulting 6.1 lb. of pressed cake contained 24% solids.

Twenty grams of the pressed wet silica were mixed with 80 g. of n-butanol. One-half cc. of concentrated ammonium hydroxide was added to insure that the silica would be at pH above 5.0. The mixture was allowed to stand for 18 hours. The resulting slurry contained 4.8% $SiO_2$ and 15.2% water.

The slurry was heated to 300° C. and 2500 p. s. i. g. pressure in an autoclave over a period of 49 minutes and the solvents were vented over a 15-minute period immediately upon reaching the above temperature and pressure. The autoclave was then closed and cooled to room temperature before being opened to the atmosphere. The product was dried in a vacuum oven at 100–110° C. and was a light fluffy powder which was hydrophobic.

The product had a specific surface area of 305 square meters per gram, as determined by nitrogen adsorption. The specific hydroxylated surface area as determined by dye adsorption was 19 square meters per gram. The carbon content was 5.27% as determined by chemical analysis. The esterification amounted to 230 ester groups per 100 square millimicrons of surface area of the siliceous substrate.

*Example 5.*—A sol of colloidal silica containing about 25% $SiO_2$ in the form of dense, discrete built-up particles, as described in Bechtold and Snyder application Ser. No. 65,536 filed December 15, 1948, now U. S. Patent No. 2,574,902 was deionized with "Nalcite HCR" resin and "Amberlite" IR-4B in order to remove $Na^+$ and $SO_4^=$ ions, respectively, and to decrease thereby the alkalinity of the silica sol.

A portion of the deionized sol was permitted to gel to reach a very viscous jelly-like state. This gel was vigorously stirred while ammonium hydroxide was added to raise the pH to 7.04.

Approximately 24 gms. of this gel at a pH of 7.04 were slurried in about 80 grams of ethanol. As in Example 1, this mixture contained 6% $SiO_2$. The weight ratio of alcohol to water in the system was 4.2:1.

A 183 ml.-capacity steel bomb was filled with this mixture to ⅔ of total volume and sealed to a pressure gauge.

The bomb and contents were heated to 310° C. and 3900 pounds per square inch gauge over a two-hour period, after which the vapors were vented from the bomb at 310° C. over a twelve-minute interval.

The bomb was then cooled slowly and subjected to a vacuum to remove the last traces of liquid from the bomb.

The product was a light, opalescent solid containing 1.31% carbon and exhibiting a surface area as determined by nitrogen gas adsorption of 107 square meters per gram of sample.

The product was organophilic and hydrophobic.

When this example was repeated at pH 8.98, the product was hard, dense and gritty, and was neither organophilic nor hydrophobic.

*Example 6.*—A conventional gel was prepared by pouring a mixture of 840 gms. of "F" grade sodium silicate and 860 gms. of water into a mixture of 523 gms. of concentrated sulfuric acid (95.5% $H_2SO_4$) and 1177 gms. of $H_2O$, with vigorous stirring.

The solution was filtered immediately and permitted to remain overnight to gel. This gel was then repeatedly slurried in water and filtered until the filtrate was free of $SO_4^=$ ions as indicated by the $BaCl_2$ test.

A portion of the gel was rinsed with acetone and air-dried followed by drying at 110° C. The surface area of this powder as determined by nitrogen gas adsorption was 769 square meters per gram.

A 100-gram portion of the sulfate-free gel was slurried in 60 grams of water and adjusted to pH 4.99 with $NH_4OH$. After sufficient time to reach equilibrium, the water was withdrawn and the gel weighed.

Ninety grams of this gel containing 7% $SiO_2$ were slurried in 395 grams of absolute ethanol and permitted to stand overnight in order to reach equilibrium. After filtration, the gel contained 7% $SiO_2$, 18% $H_2O$, and 75% $C_2H_5OH$.

Eighty grams of this gel were added to 14 grams of the filtrate from the gel to result in 6% $SiO_2$. The weight ratio of alcohol to water in the system was 3.25:1.

The same loading, heating, venting, and cooling procedures (300° C. and 4100 p. s. i.) as described in Example 5 were carried out.

The product was a very light, white-blue solid which contained 2.97% carbon and had a surface area of 261 square meters per gram as determined by nitrogen gas adsorption.

The product was organophilic and hydrophobic.

This application is a continuation-in-part of my co-pending application Ser. No. 130,374, filed November 30, 1949, for "Chemical Processes and Compositions" now abandoned.

I claim:

1. In a process for making siliceous solids hydrophobic, the steps comprising heating, in a closed system at a pressure of 2,000 to 20,000 pounds per square inch and a temperature of 270 to 375° C., an inorganic siliceous material having a specific surface area greater than one square meter per gram and having a hydrophilic surface containing a multiplicity of surface silanol groups, in an aqueous alcohol mixture which in the absence of the alcohol has a pH of 4.5 to 7.5 and which comprises the alcohol and water in a weight ratio of from 2.33:1 to 19:1, the alcohol being selected from the group consisting of primary and secondary monohydric alcohols having from 2 to 18 carbon atoms, and while maintaining the temperature in the range from 270 to 375° C., reducing the pressure substantially to atmospheric by venting vapors from the system.

2. In a process for making siliceous solids hydrophobic, the steps comprising heating, in a closed system at a pressure of 2,000 to 20,000 pounds per square inch and a temperature of 270 to 375° C., an inorganic siliceous material having a specific surface area greater than one square meter per gram and having a hydrophilic surface containing a multiplicity of surface silanol groups, in an aqueous alcohol mixture which in the absence of the alcohol has a pH of 4.5 to 7.5 and which comprises the alcohol and water in a weight ratio of from 2.33:1 to 19:1, the alcohol being selected from the group consisting of primary and secondary monohydric alcohols having from 2 to 6 carbon atoms, and while maintaining the temperature in the range from 270 to 375° C., reducing the pressure substantially to atmospheric by venting vapors from the system, and thereafter cooling the product to below 150° C. in the substantial absence of air and moisture.

3. In a process for making amorphous silica solids hydrophobic, the steps comprising heating, in a closed system at a pressure of 2,000 to 20,000 pounds per square inch and a temperature of 270 to 375° C., an inorganic amorphous silica having a specific surface area greater than one square meter per gram and having a hydrophilic surface containing a multiplicity of surface silanol groups, in an aqueous alcohol mixture which in the absence of the alcohol has a pH of 4.5 to 7.5 and which comprises the alcohol and water in a weight ratio of from 2.33:1 to 19:1, the alcohol being selected from the group consisting of primary and secondary monohydric alcohols having from 2 to 6 carbon atoms, and while maintaining the temperature in the range from 270 to 375° C., reducing the pressure substantially to atmospheric by venting vapors from the system, and thereafter cooling the product to below 150° C. in the substantial absence of air and moisture.

4. In a process for making amorphous silica solids hydrophobic, the steps comprising heating, in a closed system at a pressure of 2,000 to 20,000 pounds per square inch and a temperature of 280 to 335° C., an inorganic amorphous silica having a specific surface area greater than one square meter per gram and having a hydrophilic surface containing a multiplicity of surface silanol groups, in an aqueous alcohol mixture which in the absence of the alcohol has a pH of 4.5 to 7.5 and which comprises the alcohol and water in a weight ratio of from 2.33:1 to 19:1, the alcohol being selected from the group consisting of primary and secondary monohydric alcohols having from 2 to 6 carbon atoms, and while maintaining the temperature in the range from 280 to 335° C., reducing the pressure substantially to atmospheric by venting vapors from the system, and thereafter cooling the product to below 150° C. in the substantial absence of air and moisture.

5. In a process for making amorphous silica hydrophobic, the steps comprising heating, in a closed system at a pressure of 2,000 to 20,000 pounds per square inch and a temperature of 270 to 375° C., an inorganic amorphous silica having a specific surface area greater than one square meter per gram and having a hydrophilic surface containing a multiplicity of surface silanol groups, in an aqueous ethanol mixture which in the absence of the alcohol has a pH of 4.5 to 7.5 and which comprises the ethanol and water in a weight ratio of from 2.33 to 19:1, and while maintaining the temperature in the range from 270 to 375° C., reducing the pressure substantially to atmospheric by venting vapors from the system, and thereafter cooling the product to below 150° C. in the substantial absence of air and moisture.

6. In a process for making amorphous silica hydrophobic, the steps comprising heating, in a closed system at a pressure of 2,000 to 20,000 pounds per square inch and a temperature of 270 to 375° C., an inorganic amorphous silica having a specific surface area greater than one square meter per gram and having a hydrophilic surface containing a multiplicity of surface silanol groups, in an aqueous n-butanol mixture which in the absence of the alcohol has a pH of 4.5 to 7.5 and which comprises the n-butanol and water in a weight ratio of from 2.33 to 19:1, and while maintaining the temperature in the range from 270 to 375° C., reducing the pressure substantially to atmospheric by venting vapors from the system, and thereafter cooling the product to below 150° C. in the substantial absence of air and moisture.

7. In a process for making amorphous silica hydrophobic, the step comprising heating, in a closed system at a pressure of 2,000 to 20,000 pounds per square inch, and a temperature of 270 to 375° C., an aqueous sol of dense, discrete, inorganic silica particles 15 to 130 millimicrons in diameter having a hydrophilic surface containing a multiplicity of surface silanol groups, in a mixture with an alcohol which mixture in the absence of the alcohol has a pH of 4.5 to 7.5 and which comprises the alcohol and water in a weight ratio of from 2.33:1 to 19:1, the alcohol being selected from the group consisting of primary and secondary monohydric alcohols having from 2 to 6 carbon atoms, and while maintaining the temperature in the range from 270 to 375° C., reducing the pressure substantially to atmospheric by venting vapors from the system, and thereafter cooling the product to below 150° C. in the substantial absence of air and moisture.

8. In a process for making amorphous silica solids hydrophobic, the steps comprising heating, in a closed system at a pressure of 2,000 to 20,000 pounds per square inch and a temperature of 270 to 375° C., a silica gel in an aqueous alcohol mixture which in the absence of the alcohol has a pH of 4.5 to 7.5 and which comprises the alcohol and water in a weight ratio of 2.33:1 to 19:1, the alcohol being selected from the group consisting of primary and secondary monohydric alcohols having from 2 to 6 carbon atoms, and while maintaining the temperature in the range from 270 to 375° C., reducing the pressure substantially to atmospheric by venting vapors from the system, and thereafter cooling the product to below 150° C. in the substantial absence of air and moisture.

9. In a process for making amorphous silica solids hydrophobic, the steps comprising heating, in a closed system at a pressure of 2,000 to 20,000 pounds per square inch and a temperature of 270 to 375° C., an inorganic amorphous silica in the form of precipitated, hydrated, finely divided supercolloidal aggregates having a specific surface area greater than 25 square meters per gram and having a hydrophilic surface containing a multiplicity of surface silanol groups, in an aqueous alcohol mixture which in the absence of the alcohol has a pH of 4.5 to 7.5 and which comprises the alcohol and water in a weight ratio of from 2.33:1 to 19:1, the alcohol being selected from the group consisting of primary and secondary monohydric alcohols having from 2 to 6 carbon atoms, and while maintaining the temperature in the range from 270 to 375° C., reducing pressure substantially to atmospheric by venting vapors from the system, and thereafter cooling the product to below 150° C. in the substantial absence of air and moisture.

References Cited in the file of this patent

UNITED STATES PATENTS

| Number | Name | Date |
|---|---|---|
| 2,249,767 | Kistler | July 22, 1941 |
| 2,285,449 | Marshall | July 9, 1942 |
| 2,375,738 | White | May 8, 1945 |
| 2,438,379 | Archibald | Mar. 23, 1948 |
| 2,454,941 | Pierce et al. | Nov. 23, 1948 |
| 2,509,026 | White | May 23, 1950 |